United States Patent
McLin et al.

[11] Patent Number: 5,856,044
[45] Date of Patent: Jan. 5, 1999

[54] HIGH CAPACITY ELECTRODE PASTE AND PROCESS FOR FABRICATION

[75] Inventors: Michael McLin, Wakefield; Arthur A. Massucco, Natick; Denis G. Fauteux, Acton, all of Mass.

[73] Assignee: Mitsubishi Chemical Corporation, Japan

[21] Appl. No.: 850,920

[22] Filed: May 2, 1997

[51] Int. Cl.⁶ .................................................. H01M 4/04
[52] U.S. Cl. .......................................... 429/218; 429/209
[58] Field of Search ..................................... 429/209, 218, 429/192; 423/594

[56] References Cited

U.S. PATENT DOCUMENTS

| | | |
|---|---|---|
| 5,467,470 | 11/1995 | Moulton et al. .................... 429/212 |
| 5,543,249 | 8/1996 | Takeuchi et al. .................... 429/217 |
| 5,620,811 | 4/1997 | Zhang et al. ...................... 429/192 |

*Primary Examiner*—Stephen Kalafut
*Assistant Examiner*—Carol Chaney
*Attorney, Agent, or Firm*—Factor and Shaftal

[57] ABSTRACT

The present invention is directed to a high capacity electrode paste and process for the fabrication of same. The resultant paste has a plurality of electrochemically active particles dispersed in solution. Additionally, during fabrication of the electrode paste, the electrochemically active material is subjected to a grinding step. After grinding the material to the desired particle sizes, the grinding medium is removed. However, the particles remain dispersed in solution, even after removal of the grinding medium. Accordingly, each of the individual particles have at least a portion of their respective surfaces in contact with the solution.

19 Claims, 2 Drawing Sheets

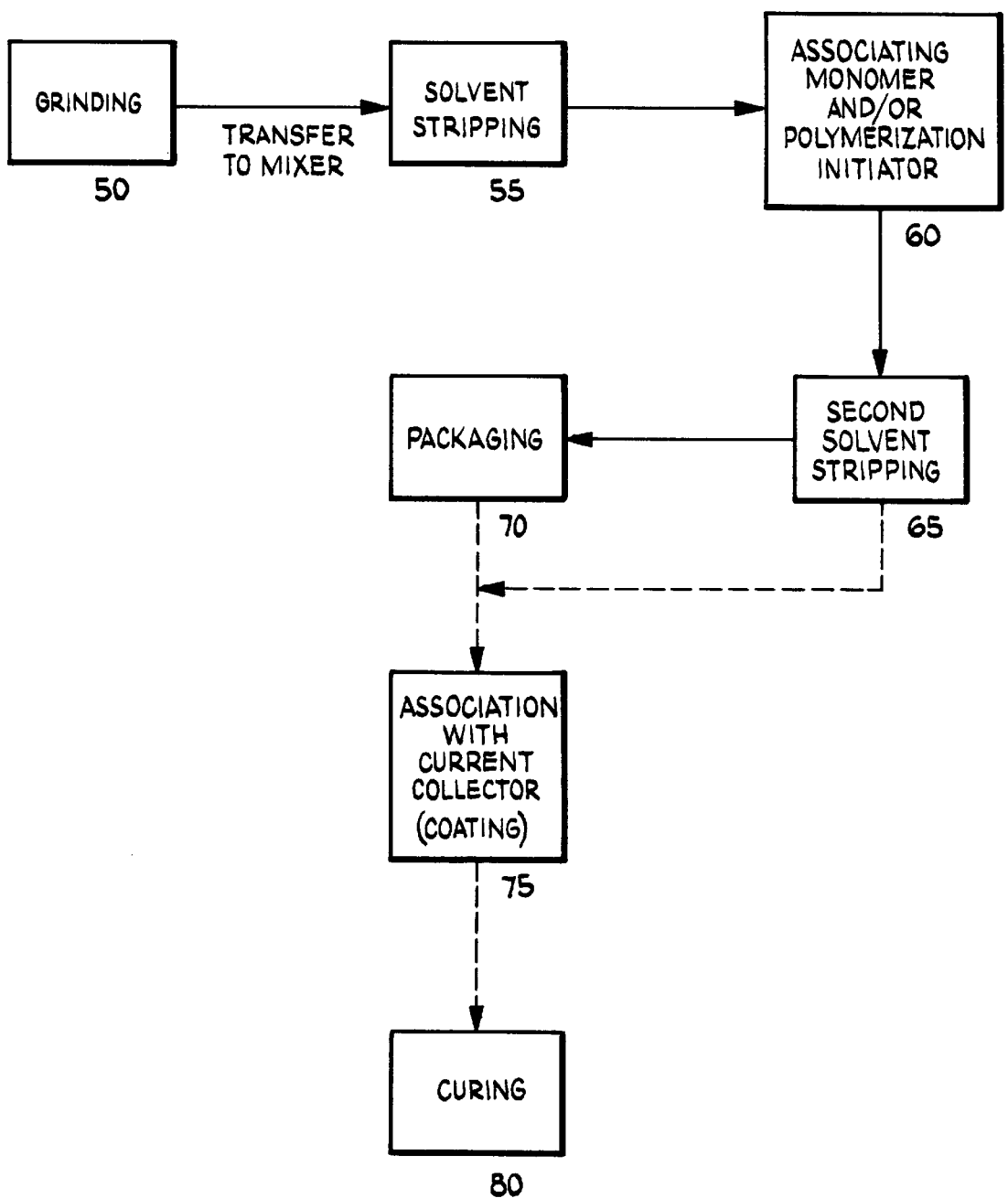

HIGH CAPACITY ELECTRODE PASTE AND PROCESS FOR FABRICATION

BACKGROUND OF THE INVENTION

1. Field of the Invention

The present invention relates in general to electrode pastes, and more particularly, to high quality high capacity electrode pastes having a plurality of particles having at least a portion of their respective surfaces in contact with an electrolyte. The invention is also directed to a process for fabricating the electrode paste.

2. Background Art

Electrode pastes associated with electrolytic cells have been known in the art for several years. Although such electrode pastes have been readily utilized in the industry, problems have been identified with respect to increasing the quality and utilization of the known theoretical capacity of such pastes. Specifically, the current manufacturing technology of electrode pastes provides for a process whereby the particle components of the pastes are ground powders having a predetermined particle size, and agglomerated particles which are subsequently incorporated into a liquid medium.

One of the problems associated with conventional electrode pastes is that a substantial plurality of the particles do not remain in contact with the solution. Indeed, when such conventional processes for fabricating the pastes are used, undesirable particle characteristics, such as agglomeration and poor particle wet-ability, are virtually unavoidable. The undesired characteristics cause at least two problems in the context of manufacturing high quality high capacity electrode pastes: 1) non-uniform electrode surface areas of contact are created; and 2) unavoidable clogging of the coating die during the electrode fabrication is observed.

Uniformity among the electrode surface areas of contact is an important attribute of any fabricated electrode—including electrodes used in association with thin film multi-cell batteries, where each individual cell requires extremely uniform performance characteristics to ensure battery life longevity. For example, if one electrode of such a multi-cell battery exhibits non-uniform surface characteristics resulting from, for example, an agglomeration of particles, the distance between an adjacent electrode may be significantly reduced. Consequently, this may significantly increase the electrical field intensity at one vector, thus dramatically increasing the probability of a short circuit between the electrodes.

SUMMARY OF THE INVENTION

The present invention is directed to an electrode paste for use in an electrolytic cell, comprising a plurality of electrochemically active particles and a solution. Each of the particles have a surface in contact with the solution.

In a preferred embodiment of the invention, the solution includes an electrolyte. Furthermore, in such an embodiment, the electrode paste has a high solid content, and exhibits a viscosity greater than or equal to $1 \times 10^4$ poise in lite of the absence of any additional solvents.

In one preferred embodiment, the electrochemically active particles are selected from at least one of the group of carbon and allotropes thereof, and transition metal oxides, such as; $LiCoO_2$, $LiNiO_2$, and $LiMn_2O_4$.

The present invention is also directed to a process for manufacturing an electrode paste for use in an electrolytic cell comprising the steps of: a) mixing electrochemically active material with a solution; b) generating a plurality of electrochemically active particles, from the mixed electrochemically active particles, within the solution; and c) contacting and maintaining at least a portion of a surface of each of the electrochemically active particles with the solution.

In a preferred embodiment of the process, the solution includes a grinding medium, and the step of generating includes the step of grinding the mixed electrochemically active material, in the solution, into particles having a predetermined substantially uniform size.

The present invention also includes the steps of: a) evaporating the grinding medium after the step of grinding; and b) separately maintaining each of the ground electrochemically active particles in the remaining solution.

In yet another preferred embodiment of the invention, the remaining solution includes an electrolyte. Additionally, it is contemplated that at least one monomer and/or polymerization initiator is added to the solution after the step of grinding.

The preferred process also includes the step of packaging/storing the electrode paste under anhydrous conditions—toward later association of the electrode paste with a current collector.

BRIEF DESCRIPTION OF THE DRAWINGS

FIG. 4 of the drawings is a flow chart of the chemical process of the present invention.

DETAILED DESCRIPTION OF THE DRAWINGS

Figure 1:
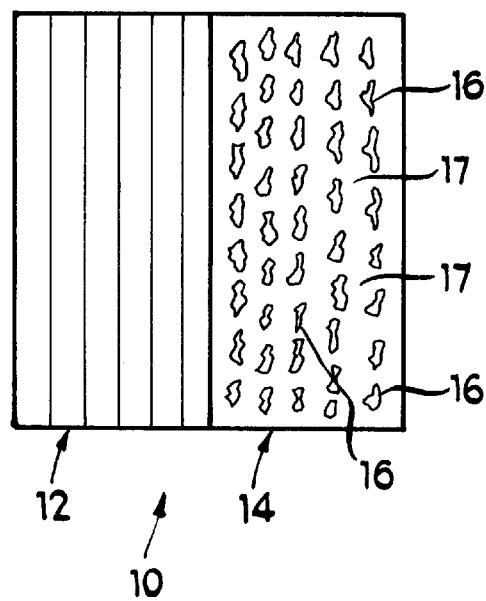
FIG. 1 of the drawings is a schematic representation of the novel electrode paste associated with a current collector.

While this invention is susceptible of embodiment in many different forms, there is shown in the drawings and will be herein described in detail specific embodiments with the understanding that the present disclosure is to be considered as an exemplification of the principles of the inventions and is not intended to limit the invention to the embodiments illustrated.

Electrode 10 is shown in FIG. 1 as including current collector 12 and electrode layer, paste layer, or electrode paste layer 14 (which layer includes the electrochemically active component). As will be understood to those with ordinary skill in the art, the electrode can comprise a cathode or anode, and, current collector 12 may comprise any of a number of conventional materials.

Figure 2:
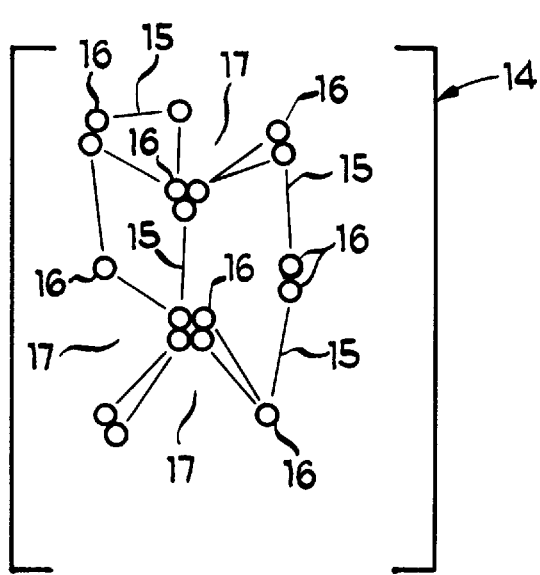
FIG. 2 of the drawings is a schematic representation of the present invention.

Electrode layer 14 includes a plurality of electrochemically active particles 16 and solution 17. The solution may include a polymerized or gelled conventional electrolyte, such as, but not limited to, polyethylene oxide associated with a lithium salt. The electrochemically active particles may be fabricated from conventional materials, such as $LiCoO_2$, $LiNiO_2$, and $LiMn_2O_4$—although other conventionally known electrochemically active particles are also contemplated for use. As shown in FIG. 2, (which is a magnification of the active material in FIG. 1) electrode layer 14 may include other components, such as conductivity enhancing particles (e.g. carbon black, graphite etc.) 15. As further shown in FIG. 2, each of the electrochemically active particles 16 are in contact with the conductivity enhancing particles 15. However, as will be discussed hereinbelow, this is characteristic not indicative of prior art materials.

As can be seen in FIG. 2, each of the surfaces of electrochemically active particles 16, are at least partially in contact with polymerized/gelled solution 17 and conductivity enhancing particles 15. As a result, electrode 10 in FIG. 1, can be fabricated (as will be explained), to have a paste layer with an extremely high percentage, by weight and volume, of electrochemically active particles, relative to the remainder of the electrode paste layer. Although the present disclosure contemplates the formation and use of substantially uniform particle sizes, it is also contemplated that non-uniform sized particles be used—as long as at least a portion of the surfaces of each respective particle is in contact with the electrolyte.

Figure 3:
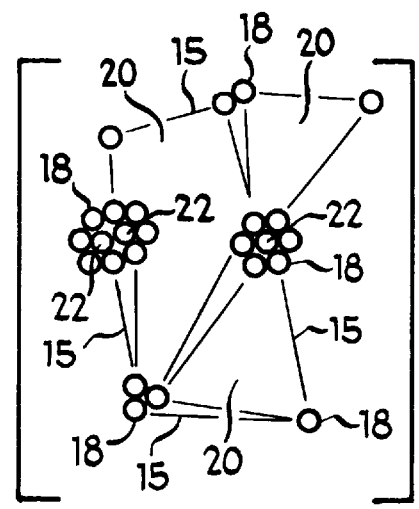
FIG. 3 of the drawings is a schematic representation of prior art material.

In contrast, and as shown in FIG. 3, the prior art exhibits electrochemically active particles 18, which are associated with electrolyte 20. However, in addition to particles 18, the prior art exhibits a substantial quantity of particles 22 which are precluded from contact with electrolyte/solution 18 and with the conductivity enhancing particles 15, as a result of being completely surrounded (agglomerated) by particles 18.

As will be explained with respect to the process for fabricating the electrode paste, association of at least a portion of the particles' surface with a solution is accomplished by grinding the electrochemically active material in a solution containing a grinding medium, and, for example a solution containing an electrolyte (in liquid form), and then evaporating the grinding medium while maintaining the ground electrochemically active particles suspended in the remaining solution (e.g. electrolyte). Indeed, such a process has resulted in electrode pastes having extremely high solid contents (exhibiting viscosities greater than or equal to $10^4$ poise).

Specifically, a flow chart diagram of the process for manufacturing a high capacity electrode paste is shown in FIG. 4. At the outset, the desired material for use in the electrode paste, as well as the grinding medium, are placed in a conventional grinder. Although numerous conventional components may be used, as would be understood to those with ordinary skill in the art, disclosure will be made to carbon and allotropes thereof, $LiCoO_2$, $LiNiO_2$, and $LiMn_2O_4$ with nonvolatile plasticizer components in an anhydrous grinding solvent medium. Also for the purposes of the present disclosure, two specific plasticizer components are identified, namely "PC" (propylene carbonate) and "EC" (ethylene carbonate); although again, other acceptable plasticizers are likewise contemplated for use, such as disclosed in U.S. Pat. No. 5,453,335, by Fauteux et al., entitled "ION-CONDUCTIVE POLYMER AND ELECTROLYTE ADDITIVES" (incorporated herein by reference). Additionally, although the grinding solvent is expressly described as either acetonitrile or "DMC" (dimethyl carbonate), other grinding solvents exhibiting similar chemical properties are also contemplated.

After the desired components are inserted in the grinder, they undergo a grinding step 50 until a desired particle size (for the electrochemically active particles) is reached. For example, it may be desirable to obtain particles having size distributions ranging from 5 to 10 microns—although other size ranges are indeed contemplated.

Once, the desired particle size/range and distribution is reached, the components are transferred into a mixer and at least a portion of the grinding solvent is removed via a conventional solvent stripping step 55. In a preferred embodiment, approximately one half of the grinding medium/solvent is removed. However, it is likewise contemplated that all of the grinding solvent be removed once the desired particle size and distribution has been obtained (provided a liquid component is maintained and used as part of the formulation for the electrolyte). Next, a reactive monomer/polymerization initiator is associated 60 with the particle components. Examples of some acceptable monomers/initiators include commercially available Photomer 4050, and EEEA (2-(2-ethoxyethoxy)ethyl acrylate); however other monomer and polymerization initiators which behave analogous to the other components in the electrode paste are also contemplated for use.

Subsequent to associating one or more monomers and/or polymerization initiators, remaining residual solvent is removed from the solution via (when done in a multi-strip stripping operation), second solvent stripping step 65. Inasmuch as the entire grinding/mixing and solvent removal processes are performed under anhydrous conditions, and inasmuch as the particular electrochemically active particles remain, at all times, dispersed in contact with liquid (during the mixing step, as well as after removal of the grinding solvent), the surfaces of the individual particles are maintained in at least partial contact with the solution. Accordingly, the surface of the electrochemically active particles will be maintained at least partially in contact with the solution, both prior to and after application of the electrode paste onto an associated current collector. Furthermore, although test data will be described wherein some residual solvent remains (e.g. less than two percent by weight of the total composition), it is also contemplated that other residual solvent concentrations remain as long as the residual solvent concentration stays below the level of adversely effecting the performance of the electrode paste. Furthermore, after the electrode paste is fabricated, it can be packaged for storage purposes 70 under anhydrous conditions.

As previously mentioned, the electrode paste will be associated with a current collector (such as a current collector used in an anode or cathode within an electrolytic cell). The actual association 75 can occur at a period of time after the electrode paste has been packaged, or, alternatively, subsequently thereto—so as to obviate packaging step 70. Such association can be accomplished through any number of conventional techniques, such as through extrusion, spreading or coating.

After the electrode paste has been associated with a current collector, the paste will then be subjected to conventional curing/rigidifying step 80—such as by polymerization of monomers contained in liquid. Once cured, a fully fabricated electrode 10 (FIG. 1) having electrochemically active particles 16, at least partially surrounded by a polymerized or gelled solution 17 (e.g. electrolyte) will have been made. Again, the actual electrode layer 14 may include other components as well.

In support of the above described invention, several experiments were conducted. The results are summarized hereinbelow.

Specifically, four experiments were conducted, wherein the following nine step experimental procedure was followed. First, all components were chemically dried. "Dryness" was verified via conventional quality assurance methods. Second, an inert atmosphere was prepared and subsequently maintained throughout each of the entire experiments, wherein the moisture concentration remained less than one hundred parts per million (ppm). Third, all solid particle components and liquid nonvolatile plasticizer components were charged into a grinding vessel containing a volatile anhydrous grinding solvent—thereby resulting in a slurry. Fourth, the slurry was ground until the desired particle size and distribution of the electrochemically active material was attained. Fifth, the slurry was quantitatively transferred from the grinding vessel to a mixing device, which contained the electrolyte components. Sixth, stripping of a portion of the volatile grinding solvent was initiated via heat, vacuum, and agitation. Seventh, after at least one half of the volatile grinding solvent was stripped, reactive monomer components were charged into the mixing vessel. Eighth, the remaining grinding solvent was stripped via heat, vacuum, and agitation until the mixing vessel maintained a constant reduced pressure value of approximately thirty millimeters of mercury. At this point the residual grinding solvent's concentration was measured to be less than two percent by weight. Ninth, the electrode paste was packaged under anhydrous conditions for use in the electrode fabrication process.

Experiment No. 1

In this experiment the chemical composition of the slurry at the fourth step of the above describe procedure was as follows:

| Chemical Components | Percent (by weight) |
| --- | --- |
| $LiCoO_2$ | 26.96 |
| Carbon Black | 2.18 |
| Graphite Carbon | 0.87 |
| Ethylene Carbonate | 5.00 |
| Propylene Carbonate | 5.00 |
| Dimethyl Carbonate | 59.98 |

As evident from the data above, the grinding solvent, dimethyl carbonate, was present in significant concentrations after the fourth step of the experimental procedure. However, after the eighth step of the experimental procedure, and as shown in the table below, the absence of the grinding solvent was observed. Note also that the concentration of the active material, $LiCoO_2$, exceeded sixty percent by weight of the fabricated electrode paste.

| Chemical Components of Fabricated Electrode Paste | Percent (by weight) |
| --- | --- |
| $LiCoO_2$ | 62.00 |
| Carbon Black | 5.00 |
| Graphite Carbon | 2.00 |
| Ethylene Carbonate | 11.50 |
| Propylene Carbonate | 11.50 |
| Photomer 4050 | 2.60 |
| 2-(2-ethoxyethoxy)ethyl acrylate | 5.40 |
| PEO (MW = 900,000) | 0.10 |

Experiment No. 2

In this experiment the chemical composition of the slurry at the fourth step of the above describe procedure was as follows:

| Chemical Components | Percent (by weight) |
| --- | --- |
| $LiCoO_2$ | 27.94 |
| Carbon Black | 1.97 |
| Graphite Carbon | 0.39 |
| Ethylene Carbonate | 3.51 |
| Propylene Carbonate | 3.51 |
| Dimethyl Carbonate | 62.98 |

As evident from the data above, the grinding solvent, dimethyl carbonate, was present in significant concentrations after the fourth step of the experimental procedure. However, after the eighth step of the experimental procedure, and as shown in the table below, the absence of grinding solvent medium was observed. Note also that the active material concentration, $LiCoO_2$, reached an unprecedented seventy percent by weight of the fabricated electrode paste.

| Chemical Components of Fabricated Electrode Paste | Percent (by weight) |
| --- | --- |
| $LiCoO_2$ | 70.00 |
| Carbon Black | 5.00 |
| Graphite Carbon | 1.00 |
| Ethylene Carbonate | 8.90 |
| Propylene Carbonate | 8.90 |
| Photomer 4050 | 2.00 |
| 2-(2-ethoxyethoxy)ethyl acrylate | 4.20 |
| PEO (MW = 300,000) | 0.10 |

Experiment No. 3

In this experiment, which is indicative of a composition suitable for use in a cathode, the chemical composition of the slurry at the fourth step of the above describe procedure was as follows:

| Chemical Components | Percent (by weight) |
| --- | --- |
| $LiCoO_2$ | 28.00 |
| Carbon Black | 1.60 |
| Graphite Carbon | 0.40 |
| Propylene Carbonate | 7.50 |
| Dimethyl Carbonate | 62.50 |

As evident from the data above, the grinding solvent, dimethyl carbonate, was present in significant concentrations after the fourth step of the experimental procedure. However, after the eighth step of the experimental procedure, and as shown in the table below, the absence of the grinding solvent was observed. Note also that the concentration of the active material, $LiCoO_2$, exceeded sixty percent by weight of the fabricated electrode paste.

| Chemical Components of Fabricated Cathode Paste | Percent (by weight) |
| --- | --- |
| $LiCoO_2$ | 63.00 |
| Carbon Black | 3.60 |
| Graphite Carbon | 0.90 |
| Propylene Carbonate | 16.90 |
| Photomer 4050 | 1.80 |
| 2-(2-ethoxyethoxy)ethyl acrylate | 3.80 |
| $LiAsF_6$ | 9.90 |
| PEO (MW = 300,000) | 0.10 |

Experiment No. 4

In this experiment, which is indicative of a composition suitable for use in an anode, the chemical composition of the slurry at the fourth step of the above describe procedure was as follows:

| Chemical Components | Percent (by weight) |
|---|---|
| Graphite Carbon | 23.00 |
| Dimethyl Carbonate | 77.00 |

As evident from the data above, the grinding solvent, dimethyl carbonate, was present in significant concentrations after the fourth step of the experimental procedure. However, after the eighth step of the experimental procedure, and as shown in the table below, the absence of the grinding solvent was observed. Note also that the concentration of the carbon graphite, exceeded fifty-two percent by weight of the fabricated anode paste.

| Chemical Components of Fabricated Anode Paste | Percent (by weight) |
|---|---|
| Graphite Carbon | 52.40 |
| Propylene Carbonate | 38.70 |
| Photomer 4158 | 2.80 |
| Photomer 4050 | 2.80 |
| 2-(2-ethoxyethoxy)ethyl acrylate | 2.30 |
| PEO (MW = 300,000) | 1.00 |

As experiments one through four demonstrate, the manufacturing of high capacity high quality electrode paste is indeed obtainable by the aforementioned process. Specifically, experiment number two exhibited remarkable characteristics. First, even after the grinding solvent was fully stripped, the surface of the solid particle components were maintained at least in partial contact with the residual solvent. Furthermore, the manufactured paste exhibited a viscosity greater than $1.0 \times 10_4$ poise. Moreover, compositional density was measured at 2.4 grams per cubic centimeter.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A process for manufacturing an electrode paste for use in an electrolytic cell comprising the steps of:

mixing electrochemically active material with a solution, wherein the solution includes a grinding medium/solvent, generating a plurality of electrochemically active particles, from the electrochemically active material, within the solution;

contacting and maintaining at least a portion of a surface of each of the electrochemically active particles with the solution;

the step of generating includes the step of grinding the mixed electrochemically active material in the solution, into particles;

at least partially evaporating the grinding medium/solvent after the step of grinding without further evaporation of the solution; and separately maintaining each of the ground electrochemically active particles in the remaining solution.

2. An electrode paste according to claim 1, wherein the plurality of electrochemically active particles have at least a portion of their respective surfaces in contact with the non-evaporated solution.

3. The electrode paste according to claim 2, wherein the non-evaporated solution contains an electrolyte.

4. The electrode paste according to claim 2, wherein the electrode paste exhibits a viscosity greater than or equal to $10^4$ poise.

5. The electrode paste according to claim 2, wherein the electrochemically active particles are selected from at least one of the group of carbon and allotropes thereof, and transition metal oxides.

6. The electrode paste according to claim 5, wherein the composition of the electrochemically active particles is at least 46.5 percent by weight of the electrode paste.

7. The electrode paste according to claim 2, wherein each of the electrochemically active particles are substantially uniformly sized.

8. An electrode according to claim 1 comprising:

a current collector, wherein the electrode paste is applied to the current collector, and, wherein the plurality of electrochemically active particles have at least a portion of their respective surfaces in contact with the non-evaporated solution.

9. The electrode according to claim 8, wherein the solution associated with the electrode paste contains an electrolyte.

10. The electrode according to claim 8, wherein the active material has a viscosity greater than or equal to $1 \times 10^4$ poise.

11. The electrode according to claim 8, wherein the electrochemically active particles are selected from at least one of the group of carbon and allotropes thereof, and transition metal oxides.

12. The electrode according to claim 11, wherein the composition of the electrochemically active particles is at least 46.5 percent by weight of the electrode paste.

13. The process according to claim 1, wherein the solution includes a grinding medium/solvent, the step of generating includes the step of:

grinding the mixed electrochemically active material, in the solution, into particles having pre-determined sizes.

14. The process according to claim 13, further including the steps of:

at least partially evaporating the grinding medium/solvent after the step of grinding; and separately maintaining each of the ground electrochemically active particles in the remaining solution.

15. The process according to claim 1, wherein the solution includes an electrolyte.

16. The process according to claim 1, further including the step of adding at least one monomer to the solution after the step of grinding.

17. The process according to claim 1, further including the step of adding at least one polymerization initiator.

18. A process for manufacturing an electrode paste according to claim 1 further comprising the steps of:

associating the electrode paste with a current collector; and at least substantially curing the electrode paste.

19. The process according to claim 18, wherein the cured solution includes a polymerized or gelled electrolyte.

* * * * *